United States Patent
Tao et al.

(10) Patent No.: US 12,554,572 B2
(45) Date of Patent: Feb. 17, 2026

(54) INTER-INTEGRATED CIRCUIT (I2C) DEVICE WITH INTERNAL BUS STUCK RECOVERY

(71) Applicant: Analog Devices, Inc., Wilmington, MA (US)

(72) Inventors: Ran Tao, Malden, MA (US); Johan H. Mansson, Malden, MA (US); Khiem Quang Nguyen, Tewksbury, MA (US); Long Thanh Pham, Tewksbury, MA (US); Shane P. Keating, Atkinson, NH (US)

(73) Assignee: Analog Devices, Inc., Wilmington, MA (US)

( * ) Notice: Subject to any disclaimer, the term of this patent is extended or adjusted under 35 U.S.C. 154(b) by 14 days.

(21) Appl. No.: 17/957,182

(22) Filed: Sep. 30, 2022

(65) Prior Publication Data

US 2024/0111619 A1 Apr. 4, 2024

(51) Int. Cl.
*G06F 11/00* (2006.01)
*G06F 11/07* (2006.01)
*G06F 13/42* (2006.01)

(52) U.S. Cl.
CPC ........ *G06F 11/079* (2013.01); *G06F 11/0745* (2013.01); *G06F 13/4282* (2013.01); *G06F 2213/0016* (2013.01)

(58) Field of Classification Search
CPC .......................... G06F 11/0745; G06F 11/3027
See application file for complete search history.

(56) References Cited

U.S. PATENT DOCUMENTS

| | | | |
|---|---|---|---|
| 6,169,348 B1 * | 1/2001 | Won ..................... | H02K 23/54 200/11 DA |
| 6,169,704 B1 * | 1/2001 | Sher ..................... | G11C 11/4076 365/194 |
| 10,067,906 B2 | 9/2018 | Lee et al. | |
| 2006/0242348 A1 * | 10/2006 | Humphrey .......... | G06F 13/4291 710/305 |
| 2008/0177917 A1 * | 7/2008 | Cagno ................. | G06F 13/4291 710/110 |

FOREIGN PATENT DOCUMENTS

| CN | 111538626 A | | 8/2020 | |
|---|---|---|---|---|
| CN | 114443394 A | * | 5/2022 | ............ G06F 11/221 |

OTHER PUBLICATIONS

Search Report and Written Opinion in PCT/US2023/074504, mailed Dec. 6, 2023, 11 pages.

* cited by examiner

*Primary Examiner* — Amine Riad
(74) *Attorney, Agent, or Firm* — ArentFox Schiff LLP

(57) ABSTRACT

Systems and methods related to serial communication devices are provided. An example integrated circuit (IC) device includes interface circuitry coupled to a two-wire serial communication bus having a serial clock (SCL) line and a serial data (SDA) bus line. The IC device further includes bus stuck recovery circuitry to monitor for a local SDA fault condition at the IC device based on a number of clock cycles during which an internal SDA signal (e.g., generated by the IC device) drives the SDA bus line to a first signal state, the clock cycles based on a clock signal received from the SCL line; and responsive to the local SDA fault condition, release the SDA bus line independent of the internal SDA signal, where the SDA bus line is in a second signal state different from the first signal state based on the release.

15 Claims, 8 Drawing Sheets

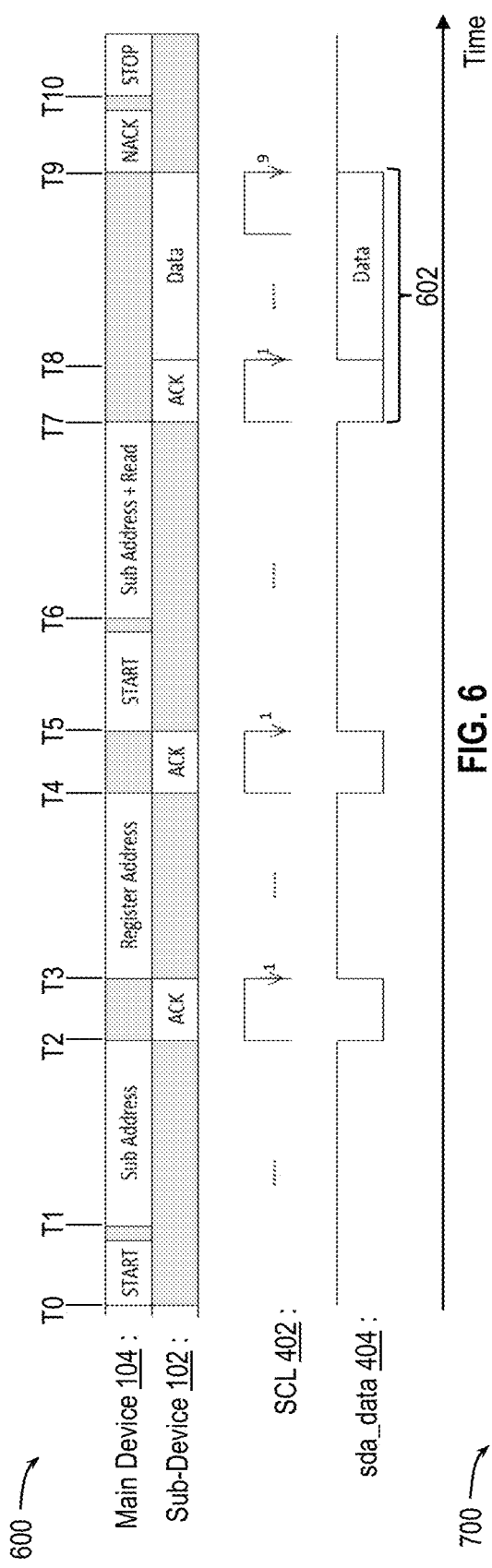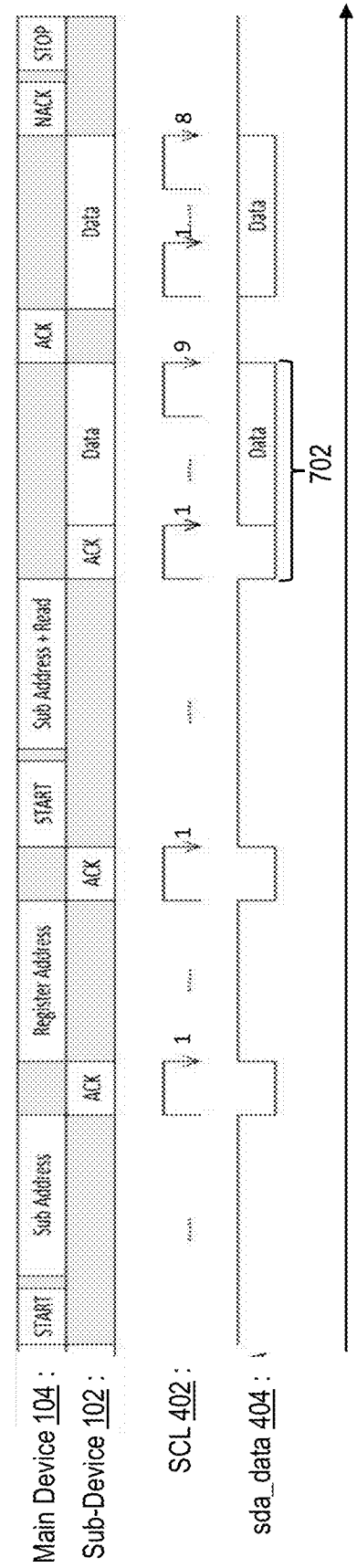

INTER-INTEGRATED CIRCUIT (I2C) DEVICE WITH INTERNAL BUS STUCK RECOVERY

TECHNICAL FIELD OF THE DISCLOSURE

The present disclosure generally relates to electronics, and more particularly to serial communication devices (e.g., inter-integrated circuit (I2C) devices).

BACKGROUND

Electronic circuits and systems may communicate with each other via a communication link referred to as a "bus." A variety of bus architectures are well known. In some examples, a bus may have as few as two active wires, although it may include additional wires for other functions. For example, an I2C bus may include two communication wires, a serial data (SDA) line and a serial clock (SCL) line.

I2C buses may be used to provide communications between two integrated circuits (ICs), for example, two or more ICs on a printed circuit board (PCB) or ICs on different PCBs. The I2C bus also may be used as a network link between electronic systems, for example in automation or control system applications.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a timing diagram illustrating an exemplary data communication over an I2C bus for a data byte read operation;

FIG. 7 is a timing diagram illustrating an exemplary data communication over an I2C bus for a burst read;

DESCRIPTION OF EXAMPLE EMBODIMENTS OF THE DISCLOSURE

Overview

Figure 1:
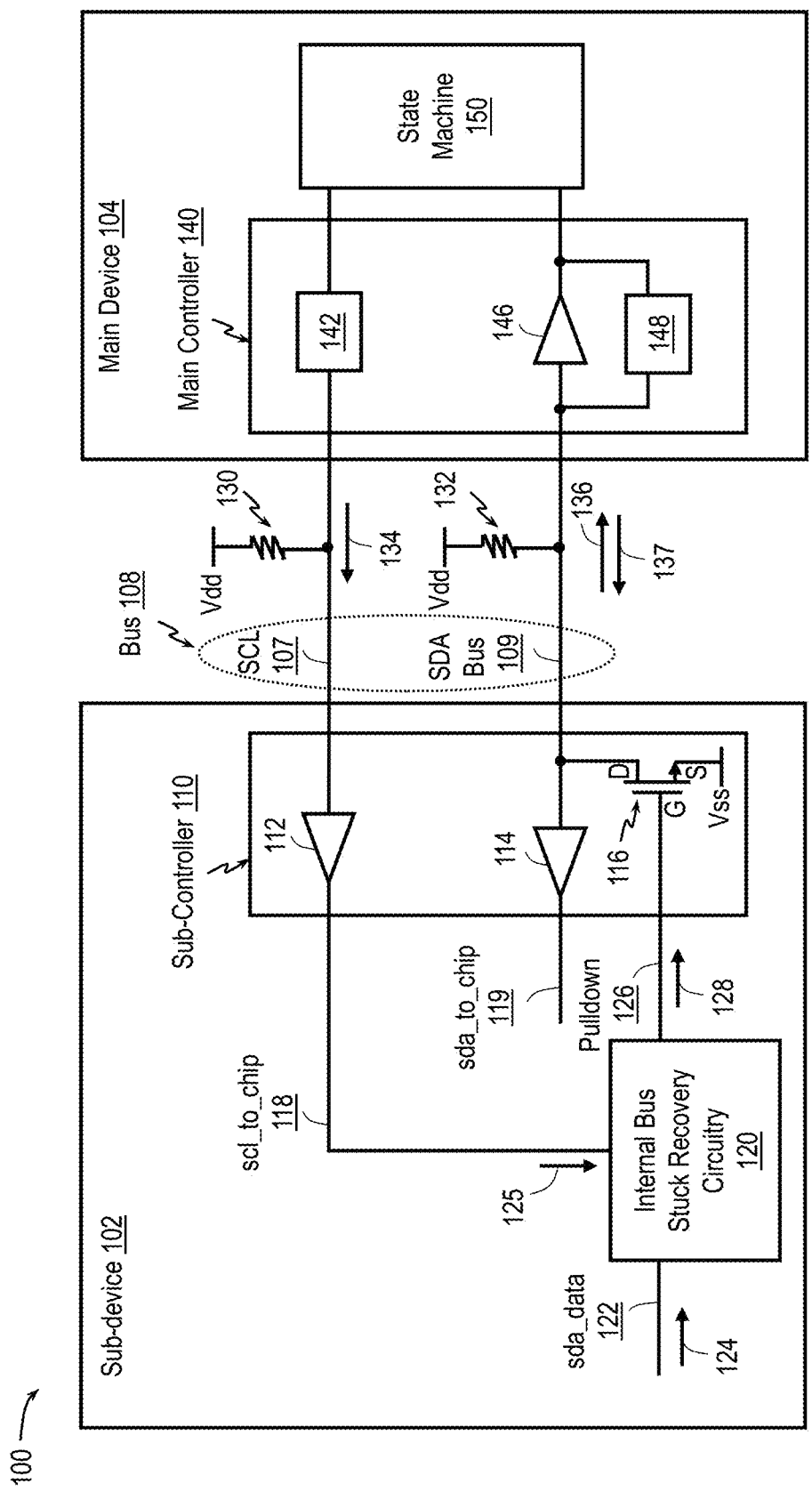
FIG. 1 is a schematic diagram illustrating an exemplary serial communication system including a main device and a sub-device, where the sub-device includes circuitry for recovering from an internal serial data (SDA) bus stuck condition, according to some embodiments of the present disclosure.

The systems, methods and devices of this disclosure each have several innovative embodiments, no single one of which is solely responsible for all of the desirable attributes disclosed herein. Details of one or more implementations of the subject matter described in this specification are set forth in the description below and the accompanying drawings.

Inter-integrated circuit (I2C) bus is a high integrity, robust serial bus used for control purposes in many systems. The primary components that make up a system are at least one main device and one sub-device. The main device may also be referred to as a master device, and the sub-device may also be referred to as a slave device. The main device and the sub-device may communicate with each other over a two-wire communication bus, which may be referred to as an I2C bus. The I2C bus may include a serial clock (SCL) line and a serial data (SDA) line. To differentiate the external SDA line between the main device and the sub-device from an internal SDA line at the sub-device (as will be discussed more fully below), the present disclosure may refer to the external SDA line as an SDA bus line. According to the I2C communication protocol (a standardized protocol used in industry), the SDA bus line is bidirectional and half-duplex. That is, at a given time, the main device may send, and the sub-device may receive data on the SDA bus line; or the sub-device may send, and the main device may receive data on the SDA bus line.

The main device may be responsible for generating a clock signal and providing the clock signal over the SCL line to the sub-device. The main device may initiate a message and define the transmission direction on the SDA bus line. That is, a sub-device may not transmit data unless it has been requested by the main device. To that end, each sub-device on the I2C bus may be assigned with a specific (unique) device address, and the main device may select a particular sub-device for communication by specifying the particular sub-device's address. A communication cycle between the main device and the sub-device may start with the main device sending a start command (a start condition) and end with the main device sending a stop command (a stop condition). A start condition may be defined by a high-to-low transition on the SDA bus line while the SCL line is high. A stop condition may be defined by a low-to-high transition on the SDA bus line while the SCL line is high. The communication between the start and the end of a communication cycle may include communicating, over the SDA bus line, the sub-device's address, register address for read or write, the read data or the data to be written. Further, for each of the communicated sub-device's address, register address, and the data, there is an acknowledgment (ACK) transmitted by a respective receiver, on the SDA bus line. The communication between the main device and the sub-device may be in units of a byte, where eight clock cycles are used for communicating 8 bits of a respective sub-device's address, register address, or data, and one clock cycle is used for communicating a respective ACK (e.g., from a receiver device). In the event of a last data byte for the communication, the main device may transmit a negative-ACK (NACK) to signal that there is no additional data to be sent. In some examples, the I2C communication protocol is used by the main device to read register value(s) from the sub-device or write values to the register(s) at the sub-device.

To facilitate bidirectional communication over the SDA bus line, the SDA bus line may be connected to a power rail via a pullup resistor. That is, the pullup resistor may be connected to the SDA bus line on one end and connected to a power rail on the other end. In the event of the SDA bus line being released by the main device or the sub-device, the pullup resistor may pull the SDA bus line voltage up to the power rail. In other words, the SDA bus line may be at a logic high voltage level upon a release of the SDA bus line. As such, if any of the main device or the sub-device would like to drive the SDA bus line to a high, the device may simply release (or "let go of") the SDA bus line. Since no device may force a high on the SDA bus line, this means that the I2C bus may not run into a communication issue where one device may try to transmit a logic high while another device is transmitting a logic low, causing a short (e.g., connecting the power rail to a ground potential).

Under normal conditions, the main device may read data from or write data to the sub-device over the I2C bus. However, in some instances, the I2C bus may get into a stuck (or deadlock) condition (e.g., an indefinite stuck condition) in which no further communication may occur between the main device and the sub-device. The bus stuck event may generally be referred to as an unknown state or a fault condition. A bus stuck event can be caused by a variety of reasons. As an example, a bus stuck event may be caused by a communication between the main device and sub-device being interrupted, for example, in the middle of a byte transmission. As another example, a bus stuck event can be cause by soft errors, which may be created by a range of phenomena associated with the interaction of energetic particles (a particles, cosmic ray neutrons and muons, energetic ions, and X-rays and y rays) also leading the IC to entering into unknown state(s). In general, the sub-device can enter an unknown state due to various reasons. Various techniques can be used to recover from such a bus fault (or stuck condition) at the I2C bus. For instance, if the sub-device has a dedicated reset pin, a hardware reset signal may be sent to the sub-device via the reset pin to reset the sub-device. If the sub-device does not have a dedicated reset pin (e.g., due to pin-count reduction to reduce a footprint and/or cost), the main device may send a hardware reset command (e.g., a start command and/or a stop command) to the sub-device to reset the communication port of the sub-device, followed by a soft reset to re-initialize the sub-device (that is, a reset to the entire sub-device) so that the main device may again communicate with the sub-device. In some instances, the sub-device can be powered cycle to recover from the unknown states.

In general, there are various the techniques for an I2C main device to resolve or recover from a global I2C bus fault but not for a bus fault that is internal to an I2C sub-device. However, in some instances, the sub-device can be stuck at a transmitting mode (or a non-receiving state) in which an internal SDA signal line at the sub-device may be stuck (e.g., indefinitely) at a logic low upon such as an unknown state or faulty event. The internal SDA signal line may carry a signal that drives the SDA bus line to a logic low or release the SDA bus line (to a logic high). When the internal SDA signal is stuck at a logic low, the SDA bus line may correspondingly be held as a logic low. As such, the sub-device may be unable to receive any commands from the main device and may need power cycling to recover from the internal SDA bus stuck condition.

Accordingly, the present disclosure provides techniques for an I2C sub-device to detect an internal SDA bus fault, and upon detection, automatically recover from the internal SDA bus fault without having to power cycle the I2C sub-device. According to an aspect of the present disclosure, in integrated circuit (IC) device may include interface circuitry coupled to a two-wire serial communication bus having an SCL line and an SDA bus line. In a certain aspect, the two-wire serial communication bus is an I2C bus, the IC device is an I2C sub-device and may be coupled to an I2C main device via the I2C bus (e.g., an external bus). To address the internal SDA bus fault issues discussed above, the IC device may additionally include internal bus stuck recovery circuitry. The internal bus stuck recovery circuitry may monitor an internal SDA signal on an internal SDA signal line at the IC device. The internal SDA signal may be generated (locally or internally) by the IC device and may carry data to be transmitted on the SDA bus line. The IC device may include circuitries to drive the SDA bus line to a low or release the SDA bus line according to the internal SDA signal. For instance, the SDA bus line may be driven to a low when a bit value to be transmitted is 0 and may be released when a bit value to be transmitted is 1. The internal bus stuck recovery circuitry may determine whether an internal SDA bus fault condition has occurred based on the monitoring.

As used herein, an internal SDA bus fault condition may refer to a stuck or deadlock condition at an internal SDA signal line of a sub-device, causing the sub-device to be unable to further communicate with a respective main device. By observing the I2C communication protocol, there is a maximum number of consecutive clock cycles (e.g., 9 clock cycles) during which the SDA bus line (and correspondingly the internal SDA signal) can stay at a logic low under normal operations. As such, an internal SDA signal staying (or stuck) at a logic low for a duration longer than the maximum number of consecutive clock cycles can be used as an indication of an internal SDA bus fault. The present disclosure may use the terms "internal SDA bus fault," "internal SDA bus fault condition" "internal SDA bus stuck condition," and "local SDA bus fault condition" interchangeably to refer to the condition in which the internal SDA signal at the sub-device occupies the SDA bus line illegally (stay at a logic low for a duration longer than a threshold number of clock cycles).

Accordingly, the internal bus stuck recovery circuitry may determine whether an internal SDA bus fault condition has occurred based on a number of consecutive clock cycles during which the internal SDA signal stays at a logic low. In this regard, the internal bus stuck recovery circuitry may determine that the internal SDA bus fault condition has occurred when the number of consecutive clock cycles during which the internal SDA signal stays at a logic low is greater than a threshold number of cycle count (e.g., set according to the I2C communication protocol). Conversely, the internal bus stuck recovery circuitry may determine that no internal SDA bus fault condition has occurred when the number of consecutive clock cycles during which SDA signal stays at a logic low does not exceed the threshold number of cycle count.

If the internal bus stuck recovery circuitry determines that no internal SDA bus fault condition has occurred, the internal bus stuck recovery circuitry may control the SDA bus line based on the internal SDA signal. If, however, the internal bus stuck recovery circuitry determines that the internal SDA bus fault condition has occurred, the internal bus stuck recovery circuitry may release control of the SDA bus line. In other words, upon detecting the occurrence of the internal SDA bus fault condition, the internal bus stuck recovery circuitry may release control of the SDA bus line independent of the internal SDA signal.

The systems, schemes, and mechanisms described herein advantageously enable an I2C sub-device to automatically recover from an internal SDA bus stuck condition without power-cycling the sub-device. While the present disclosure is described in the context of detecting and recovering from an internal SDA bus fault at a sub-device implementing the I2C communication protocol, the disclosed techniques are applicable for use with other serial communication protocols.

FIG. 1 is a schematic diagram illustrating an exemplary serial communication system 100 including a main device 104 and a sub-device 102, where the sub-device 102 includes circuitry for recovering from an internal SDA bus stuck condition, according to some embodiments of the present disclosure. At a high level, the sub-device 102 may include internal bus stuck recovery circuitry 120 to monitor for an internal SDA bus fault or stuck condition at the sub-device 102 and to recover from the internal SDA bus fault or stuck condition upon a detection.

As shown in FIG. 1, the sub-device 102 may be coupled to the main device 104 via a bus 108. The bus 108 may include an SCL line 107 and a bidirectional SDA bus line 109. In some aspects, the sub-device 102 may be an I2C sub-device, the main device 104 may be an I2C main device, the bus 108 may be an I2C bus, and the sub-device 102 and the main device 104 may communicate with each other over the bus 108 according to the I2C communication protocol. In some examples, each of the sub-device 102 or the main device 104 may be part of an IC device. In certain examples, the main device 104 may be a microcontroller (MCU), and the sub-device 102 may be a peripheral device (e.g., a sensor, a LED driver, an analog-to-digital converters (ADC), a digital-to-analog converter (DAC), memory, an optical device, etc.). For simplicity, FIG. 1 illustrates the main device 104 in communication with one sub-device. However, the main device 104 may communicate with any suitable number of sub-devices 102 (e.g., 2, 3, 4 or more). Further, each of the main device 104 and the sub-device 102 can include other components that are not illustrated. For instance, the sub-device 102 may include a register block including registers that can be read from or write to by the main device 104. In some examples, the sub-device 102 may be similar to the device 2400 of FIG. 10 or may be part of the device 2400.

As further shown in FIG. 1, the SCL line 107 may be connected to a power rail (e.g., Vdd) via a resistor 130, where the resistor 130 may be connected to the SCL line 107 on one end and connected to Vdd on the other end. Similarly, the SDA bus line 109 may be connected to a power rail (e.g., Vdd) via a resistor 132, where the resistor 132 may be connected to the SDA bus line 109 on one end and connected to Vdd on the other end. The resistors 130 and 132 may be referred to as pullup resistors. In this regard, the main device 104 may toggle the clock signal 134 between a logic high and a logic low by releasing the SCL line 107 (so that the pullup resistor 130 may pull the SCL line 107 to Vdd) and driving the SCL line 107 to a low, respectively. In a similar way, the main device 104 or the sub-device 102 may release the SDA bus line 109 (so that the pullup resistor 132 may pull the SDA bus line 109 to Vdd) or drive the SCL line 107 to a logic low. In general, a transmitter device may release the SDA bus line 109 to transmit a bit value "1" or drive the SDA bus line 109 to a logic low voltage level (e.g., ground) to transmit a bit value "0". A receiver device may release the SDA bus line 109 and let a transmitter device to control the SDA bus line 109.

As further shown in FIG. 1, the main device 104 may include a main controller 140 and state machine circuitry 150. The main controller 140 may be coupled to the bus 108. More specifically, the main controller 140 may include a driver device 142 coupled to the SCL line 107, a driver device 148 and a buffer 146 coupled to the SDA bus line 109. The driver device 142 may drive the SCL line 107 to a logic low or release the SCL line 107 (so that the pullup resistor 130 may pull the SCL line 107 to Vdd). The main controller 140 may transmit a clock signal on the SCL line 107 to the sub-device 102 via the driver device 142. Similarly, the driver device 148 may drive the SDA bus line 109 to a logic low or release the SDA bus line 109 (so that the pullup resistor 132 may pull the SDA bus line 109 to Vdd). The main controller 140 may transmit a data signal 137 on the SDA bus line 109 to the sub-device 102 via the driver device 148. The buffer 146 may receive a data signal 136 from the SDA bus line 109 and buffer the received data signal 136. The transmission of the signal 137 and the reception of the signal 136 may occur at different times (e.g., due to the SDA bus line 109 being a bidirectional, half-duplex transmission line). For simplicity, circuitries for clock generation, data generation, and data reception are not illustrated in FIG. 1. The state machine circuitry 150 may include logics to implement a state machine (e.g., the state machine 200 of FIG. 2) to detect a bus fault at the SDA bus line 109 and to resolve or recover from the bus fault as will be discussed more fully below. The bus fault on the SDA bus line 109 may be referred to as an external bus fault.

As further shown in FIG. 1, the sub-device 102 may include a sub-controller 110 (e.g., interface circuitry) and internal bus stuck recovery circuitry 120. The sub-controller 110 may be coupled to the bus 108. More specifically, the sub-controller 110 may include a buffer 112 coupled to the SCL line 107 and a buffer 114 coupled to the SDA bus line 109. The buffer 112 may receive the clock signal 134 from the SCL line 107, buffer the received clock signal 134, and provide the buffered clock signal (shown by 125) to the internal bus stuck recovery circuitry 120 via a signal line 118 (shown as scl_to_chip). The buffer 114 may receive the data signal 137 from the SDA bus line 109, buffer the received data signal 137, and provide the buffered data signal to data reception circuitry (not shown) at the sub-device 102 via a signal line 119 (shown as sda_to_chip). While not shown, in some examples, the received clock signal 134 may also be provided to the data reception circuitry for data reception.

The sub-controller 110 may further include a transistor 116. While FIG. 1 illustrates the transistor 116 as an N-type metal-oxide-semiconductor (NMOS) transistor, the transistor 116 can be a field-effect transistor (FET), a P-type metal-oxide-semiconductor (PMOS) transistor, or any suitable type of device. As shown, the transistor 116 is coupled between the internal bus stuck recovery circuitry 120 and the SDA bus line 109. More specifically, the gate terminal (G) of the transistor 116 is coupled to an output of the internal bus stuck recovery circuitry 120 via a pulldown signal line 126, the drain terminal (D) of the transistor 116 is coupled to the SDA bus line 109, and the source terminal (S) of the transistor 116 is coupled to a voltage Vss (e.g., a ground potential). The transistor 116 may be turned on or off based on a gate voltage (shown by the signal 128) provided on the pulldown signal line 126. The signal 128 may be output by the internal bus stuck recovery circuitry 120 as will be discussed more fully below with reference to FIG. 3. When the transistor 116 is turned on, the SDA bus line 109 is pulled down (or driven) to Vss (e.g., corresponding to a logic low state). Conversely, when the transistor 116 is turned off, the SDA bus line 109 is released in which the resistor 132 may pull the SDA bus line 109 to Vdd (e.g., corresponding to a logic high state). In some aspects, each of the driver devices 142 and 148 at the main controller 140 may operate substantially the same as the transistor 116. In an example, the driver device 142 may include a transistor similar to the transistor 116, where the drain of the transistor may be connected to the SCL line 107, the gate of the transistor may be connected to the state machine circuitry 150, and the source of the transistor may be connected to Vss. Similarly, the driver device 148 may include a transistor similar to the transistor 116, where the drain of the transistor may be connected to the SDA bus line 107, the gate of the transistor may be connected to the state machine circuitry 150, and the source of the transistor may be connected to Vss.

The internal bus stuck recovery circuitry 120 may receive an internal SDA signal 124 via an internal SDA bus or signal line 122 (shown as sda_data). The internal SDA signal 124 may be generated by data generation circuitry (not shown) at the sub-device 102. In some examples, the internal SDA signal 124 may have a default state (e.g., after a reset or when not in transmission) at a logic high. For transmission, the internal SDA signal 124 may carry data to be sent to the main device 104. In some examples, the data in the SDA signal 124 can be a value retrieved from a register of the sub-device, where the register may have an address corresponding to a register address specified by the main device 104 for a data read. As will be discussed more fully below with reference to FIG. 3, the internal bus stuck recovery circuitry 120 may include logics to monitor for an internal SDA bus fault or stuck condition at the internal SDA signal line 122 and to recover from the internal SDA bus fault or stuck condition upon a detection of the internal SDA bus fault or stuck condition.

As will be discussed more fully below with reference to FIGS. 4-7, there is a maximum number of clock cycles (e.g., 9 clock cycles) during which an SDA bus line 109 can stay at a logic low under normal operations according to the I2C communication protocol. As such, an internal SDA signal (that drives the SDA bus line 109) staying at a logic low for a duration longer than the maximum number of consecutive clock cycles is an indication that an internal SDA bus fault has occurred. Accordingly, the internal bus stuck recovery circuitry 120 may monitor for an internal SDA bus fault condition at the sub-device 102 based on a number of clock cycles during which the internal SDA signal 124 drives the internal SDA signal line 122 to a logic low (e.g., a first signal state), where the clock cycles may be provided by the clock signal 134. More specifically, the internal bus stuck recovery circuitry 120 may determine that no internal SDA bus fault condition has occurred if the number of clock cycles during which the internal SDA signal 124 drives the internal SDA signal line 122 to a logic low is less than a threshold number of clock cycle count. In an example, the threshold number of clock cycle count may be set to at least 9 based on the I2C communication protocol. In general, the threshold number of clock cycle count may be set to any suitable values greater than 8 (e.g., 9, 10, 11, 12). Conversely, the internal bus stuck recovery circuitry 120 may determine that the internal SDA bus fault condition has occurred if the number of clock cycles during which the internal SDA signal 124 drives the internal SDA signal line 122 to a logic low satisfies (greater than or equal to) the threshold number of clock cycle count.

If there is no internal SDA bus fault detected, the internal bus stuck recovery circuitry 120 may control the SDA bus line 109 based on the internal SDA signal 124. To this end, when the internal SDA signal 124 is at a logic high, the internal bus stuck recovery circuitry 120 may turn the transistor 116 off, allowing the resistor 132 to pull the SDA bus line 109 to Vdd (corresponding to a logic high). On the other hand, when the internal SDA signal 124 is at a logic low, the internal bus stuck recovery circuitry 120 may turn the transistor 116 on, driving the SDA bus line 109 to Vss (corresponding to a logic low).

If, however, an internal SDA bus fault is detected, the internal bus stuck recovery circuitry 120 may disregard the internal SDA signal 124 and release control of the SDA bus line 109. In other words, the internal bus stuck recovery circuitry 120 may release control of the SDA bus line 109 independent of the internal SDA signal 124 upon detecting an internal SDA bus fault. The releasing control of the SDA bus line 109 may refer to not pulling the SDA bus line 109 to a logic low (e.g., turning off the transistor 116) and allowing the pullup resistor 132 to pull the SDA bus line 109 to Vdd (e.g., a second signal state).

While FIG. 1 illustrates the internal bus stuck recovery circuitry 120 as a separate component from the sub-controller 110, in some examples, the internal bus stuck recovery circuitry 120 can be implemented as part of the sub-controller 110.

Figure 2:
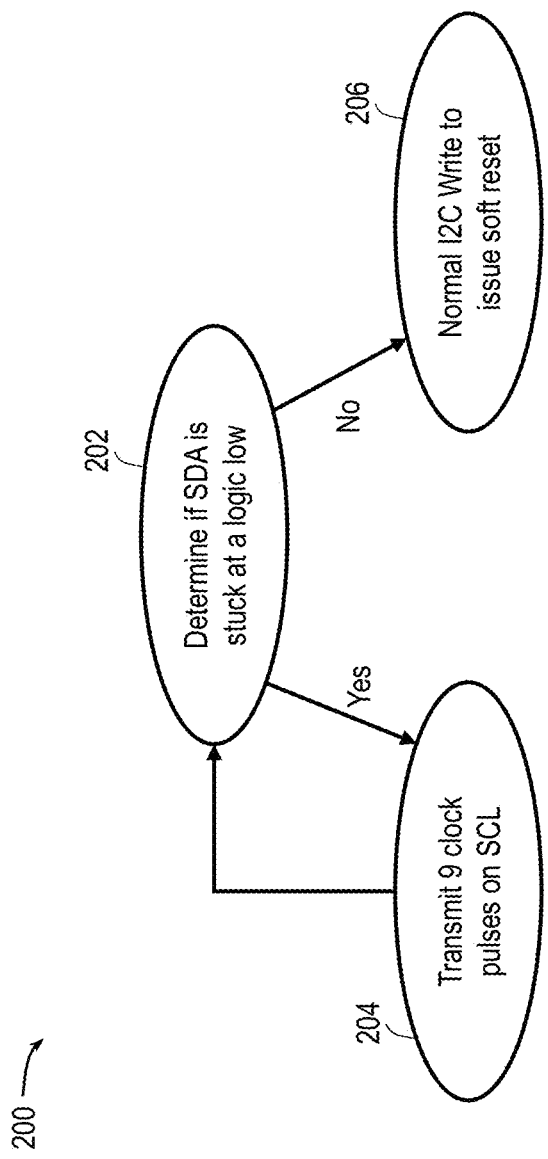
FIG. 2 illustrates an exemplary state machine for recovering from an external bus stuck condition.

FIG. 2 illustrates an exemplary state machine 200 for recovering from an external bus stuck condition. The state machine 200 may be implemented by the main device 104. More specifically, the state machine 200 may be implemented by the state machine circuitry 150 at the main device 104 after a bus stuck. As discussed above, the bus stuck may be caused by the main device 104 being interrupted in the middle of its communication with the sub-device 102, and an external bus fault may occur at the SDA bus line 109 in which the SDA bus line 109 is stuck at a logic low. As shown in FIG. 2, the state machine 200 may include states 202, 204, and 206.

At the state 202, the main device 104 may determine if the SDA bus line 109 is stuck at a logic low (e.g., 0). If the SDA bus line 109 is stuck at the logic low, the state machine 200 may transition to the state 204.

At the state 204, the main device 104 may transmit 9 clock pulses on the SCL line 107. As will be discussed more fully below with reference to FIGS. 4-7, the I2C communication protocol uses 8 clock cycles for data (e.g., 1 byte) and 1 clock cycle for ACK for each data byte communication. The transmission of the 9 clock pulses by the main device 104 may be based on a worst-case scenario in which the main device 104 is interrupted after transmitting an ACK (for a previous data byte communication) to the sub-device 102 and the sub-device 102 is waiting to transmit 8 bits of data to the main device 104 and receive an ACK or NACK from the main device 104. After transmitting the 9 clock pulses, the state machine 200 may repeat the state 202.

At the state 202, if the main device 104 determines that the SDA bus line 109 is not stuck at a logic low (i.e., the SDA bus line 109 is at a logic high), the state machine 200 may transition to the state 206. At the state 206, the main device 104 may perform a normal I2C write to issue a soft reset command to the sub-device 102 so that the sub-device 102 may be re-initialized. Examples of I2C write operations under normal operations are discussed below with reference to FIGS. 4-5.

Figure 3:
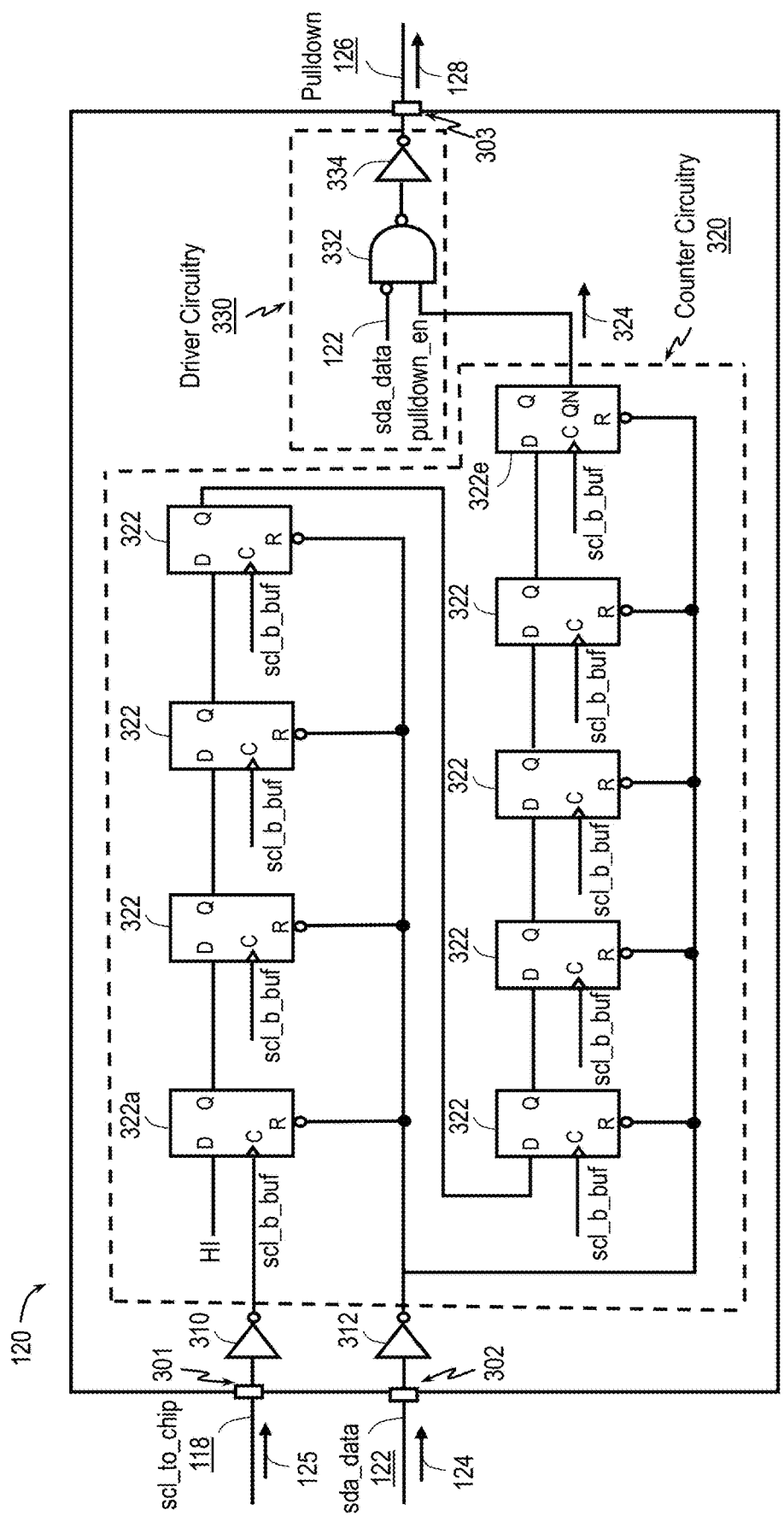
FIG. 3 is a schematic diagram illustrating an exemplary implementation of internal SDA stuck recovery circuitry, according to some embodiments of the present disclosure.

FIG. 3 is a schematic diagram illustrating an exemplary implementation of the internal SDA data stuck recovery circuitry 120, according to some embodiments of the present disclosure. The implementation shown in FIG. 3 is one example. In general, the internal bus stuck recovery circuitry 120 can be implemented using any suitable gates and logic circuitries to provide similar functionalities.

As shown in FIG. 3, the internal bus stuck recovery circuitry 120 may include two input ports 301 and 302 and one output port 303. The input port 302 (e.g., a first port) may be coupled to the internal SDA signal line 122 to receive an internal SDA signal 124 generated locally at the IC device 102. The input port 301 (e.g., a second port) may be coupled to the scl_to_chip signal line 118 to receive a clock signal 125 corresponding to a clock signal 134 received from the SCL line 107. The output port 303 (e.g., a third port) may be coupled to the pulldown signal line 126 to output a signal 128 (e.g., a driver control signal). As discussed above with reference to FIG. 1, the signal 128 may drive the gate of the transistor 116 to turn the transistor 116 (at the sub-controller 110) on or off, which in turns releases the SDA bus line 109 (so that the pullup resistor 132 can pull the SDA bus line 109 to Vdd corresponding to a logic high) or pulls the SDA bus line 109 to a logic low, respectively.

As further shown in FIG. 3, the internal bus stuck recovery circuitry 120 may include NOT gates 310 and 312, counter circuitry 320, and driver circuitry 330. The NOT gate 310 may be coupled to the input port 301 to receive the clock signal 125. The NOT gate 312 may be coupled to the input port 302 to receive the internal SDA signal 124. At a high level, the counter circuitry 320 may count a number of consecutive clock cycles (clock cycles of the clock signal 125) during which the internal SDA signal 124 stays at a logic low and may disable the driver circuitry 330 from driving the SDA bus line 109 to a logic low upon a detection of the internal SDA signal 124 staying at a logic low for a duration longer than a threshold number of clock cycles (e.g., set based on the I2C communication protocol).

The counter circuitry 320 may include a plurality of flip-flops 322. The flip-flops 322 are arranged in a cascade configuration, where a beginning flip-flop 322 in the cascade configuration is labeled by 322a and a last flip-flop 322 in the cascade configuration is labeled by 322e). In some aspects, the number of flip-flops 322 in the counter circuitry 320 may be related to the threshold number of cycle count used for determining whether the internal SDA signal is stuck at a logic low. For instance, the SDA bus line 109 cannot stay at a logic low for more than 9 clock cycles under normal operations according to the I2C communication protocol, and thus the number of flip-flops 322 is 9 in the illustrated example.

Because the clock cycles are provided by the main device 104, the operations of the internal SDA data stuck recovery circuitry 120 shown in FIG. 3 may assume that the main device 104 may provide 9 clock cycles to the sub-device 102 upon detecting a stuck (a global bus stuck) at the SDA bus 109 as discussed above with reference to FIG. 2). In general, the counter circuitry 320 can include any suitable number of flip-flops 322 that is greater than the maximum number of clock cycles in which the SDA bus line 109 can stay at a logic low under normal operations. However, if the number of flip-flops 322 is greater than 9, then the number of SCL clocks transmitted by the main device 104 may be greater than 9 as well. That is, there needs to be an agreement or coordination between the main device 104 and the sub-device 102 on how the main device 104 may handle a detection of a global bus stuck at the SDA bus 109. In some examples in the case when the main device 104 does not implement the state machine 200 (to provide the 9 additional clock cycles upon a global bus stuck), the main device 104 is performed one dummy I2C write before sending a hardware reset command to the sub-device 102.

As further shown, each flip-flop 322 may include a data port (denoted as D), a clock port (denoted as C), a reset port (denoted as R), and an output port (denoted as Q). For the cascade configuration, the data port of each the flip-flop 322 is connected to the output port of a previous flip-flop 322, except for the beginning flip-flop 322a in which its data port is tied to a logic high. Additionally, each of the flip-flops 322 is triggered or clocked by negative edges (e.g., high-to-low transitions) of the clock signal 125 (shown by scl_b_buf). As will be discussed more fully below with reference to FIGS. 6-7, clocking the flip-flops 322 based on the negative clock edges are important for the detection to operate correctly. Further, each of the flip-flops is reset when the internal SDA signal 124 is at a logic high voltage level.

The driver circuitry 330 may include a NAND gate 332 and a NOT gate 334. The NAND gate 332 may include one input coupled to the internal SDA signal line 122 to receive an inverted version of the internal SDA signal 124 (shown by the bubble at the respective input). The NAND gates 332 may include another input coupled to an inverted output port (shown by QN) of the last flip-flop 322e. The output of the counter circuitry 320 corresponding to the output from the inverted output port of the flip-flop 322e is shown by 324. The output of the NAND gate 332 may be provided to the NOT gate 334, and the output of the NOT gate 334 may be provided as the driver control signal 128 on the pulldown signal line 126.

In operation, if the internal SDA signal 124 is at a logic high, the flip-flops 322 may be reset, and the output 324 of the counter circuitry 320 (or the inverted output of the last flip-flop 322e) may be at a logic high. When the internal SDA signal 124 is high and the output 324 is high, the output of the NAND gate 332 may be at a logic high. Thus, the output of the NOT gate 334 may be at a logic low. In other words, the driver control signal 128 may be at a logic low, which may turn the transistor 116 off, causing the SDA bus line 109 to be released. As such, the SDA bus line 109 may be at a logic high voltage level.

If, however, the internal SDA signal 124 is at a logic low, the reset to the flip-flops 322 may be released. The logic high at the data port of the beginning flip-flop 322a may propagate to a next flip-flop 322. If the internal SDA signal 124 remains low for more than 9 consecutive clock cycles, the logic high at the data port of the beginning flip-flop 322a may propagate to the data port of the last flip-flop 322e. Consequently, the output 324 (provided by counter circuitry 320) may be a logic low. As such, the output of the NAND gate 332 may always be at a logic high independent of the internal SDA signal 124, and thus the output of the NOT gate 334 may always be at a logic low. In other words, the driver control signal 128 may be at a logic low, which may turn the transistor 116 off, causing the SDA bus line 109 to be released.

Before the logic high from the data port of the beginning flip-flop 322a propagate to the last flip-flop 322e, the output 324 (provided by counter circuitry 320) may remain at a logic high. As such, the output of the NAND gate 332 may follow the internal SDA signal 124. That is, the output of the NAND gate 332 may be at a logic low, the output of the NOT gate 334 may be at a logic high, turning the transistor 116 on and causing the SDA bus line 109 to be pulled to a logic low voltage level (e.g., Vss). As such, the output 324 may operate as a pulldown enable signal. In this regard, if the internal SDA signal 124 has not been at a logic low for more than 9 consecutive cycles, the output 324 (of the counter circuitry 320) may be at a logic high to enable (or allow) the SDA bus line 109 to be pulled to a logic low voltage level based on the internal SDA signal 124 being at a logic low. If, however, the internal SDA signal 124 remains at a logic low for more than 9 consecutive clock cycles, the output 324 (of the counter circuitry 320) may be at a logic low to disable (or disallow) the SDA bus line 109 to be pulled to a logic low voltage level.

In some aspects, an IC device may include interface circuitry and I2C bus stuck recovery circuitry. The IC device may correspond to the sub-device 102, the interface circuitry may correspond to the sub-controller 110, and the I2C bus stuck recovery circuitry may correspond to the internal bus stuck recovery circuitry 120. The interface circuitry may be for connection to an I2C bus including an SCL line and an SDA bus line. The I2C bus, the SCL line, and the SDA bus line may correspond to the bus 108, the SCL line 107, and the SDA bus line 109, respectively. The I2C bus stuck recovery circuitry may include a first port (e.g., the input port 302) to receive an SDA signal (an internal SDA signal) generated locally at the IC device, a second port (e.g., the input port 301) coupled to the interface circuitry to receive a clock signal from the SCL line, and a third port (e.g., the output port 303) to output a driver control signal (e.g., the driver control signal 128) to the interface circuitry for driving the SDA bus line. The I2C bus stuck recovery circuitry may further include first logic circuitry (e.g., the counter circuitry 320 of FIG. 3) to generate a pulldown-enable signal (e.g., the output signal 324) to selectively enable or disable pulling the SDA bus line to a logic low voltage level. The generation of the pulldown-enable signal may be based on a number of consecutive clock cycles of the clock signal during which the internal SDA signal has a logic low. The I2C bus stuck recovery circuitry may further include second logic circuitry (e.g., the driver circuitry 330) to generate the driver control signal based at least in part on the pulldown-enable signal.

In some aspects of the IC device, the first logic circuitry may generate the pulldown-enable signal to disable pulling the SDA bus line to the logic low voltage level based on the number of consecutive clock cycles during which the internal SDA signal has the logic low satisfies (equal to or greater than) a threshold clock cycle count (e.g., set to at least 9 according to the I2C communication protocol). Conversely, the first logic circuitry may generate the pulldown-enable signal to enable pulling the SDA bus line to the logic low voltage level based on the number of consecutive clock cycles during which the internal SDA signal has the logic low is less than the threshold clock cycle count.

In some aspects, the first circuitry may include a plurality of cascaded flip-flops (e.g., the flip-flops 322) clocked by negative edges of the clock signal. Further, the cascaded flip-flops may be reset based on the internal SDA signal at the IC device having a logic high. In some aspects, the interface circuitry may include a transistor (e.g., the transistor 116) having a drain terminal coupled to the SDA bus line, a gate terminal coupled to the third port of the I2C bus stuck recovery circuitry, and a source terminal coupled to a voltage rail having a voltage corresponding to the logic low voltage level.

FIGS. 4-7 illustrate various example read/write operations between the main device 104 and the sub-device 102 under normal operations. In FIG. 4-7, the x-axes may represent time in some arbitrary units. Further, the SCL 402 may correspond to the clock signal 134 on the SCL line 107, and the sda_data 404 may correspond to the internal SDA signal 124 on the internal SDA signal line 122.

Figure 4:
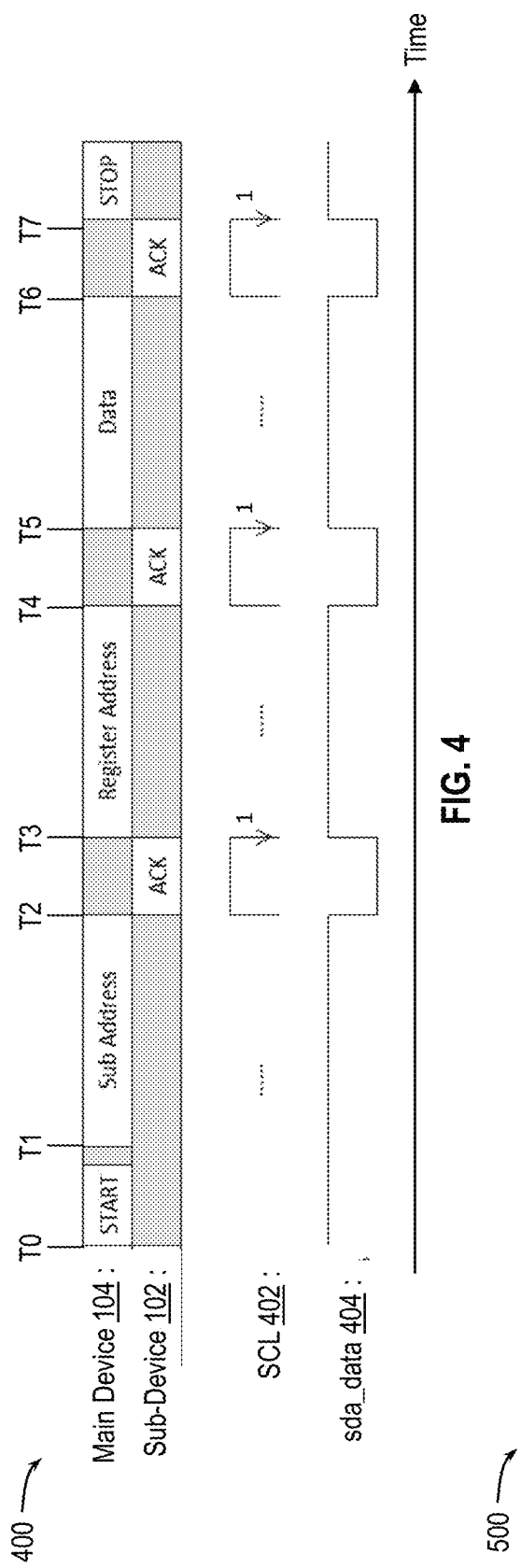
FIG. 4 is a timing diagram illustrating an exemplary data communication over an inter-integrated circuit (I2C) bus for a data byte write operation.

FIG. 4 is a timing diagram illustrating an exemplary data communication 400 over an I2C bus for a data byte write operation. For instance, the main device 104 may write a single byte of data to the sub-device over the bus 108 as shown by the data communication 400.

As shown in FIG. 4, at time T0, the main device 104 may transmit a start command (shown by START). As discussed above, the start command or start condition may be defined by a high-to-low transition on the SDA bus line 109 while the SCL line 107 is high. At time T1, the main device may transmit an address of the sub-device 102 (shown by Sub Address) requesting communication with the sub-device 102. At time T2, upon detecting the Sub Address corresponding to the sub-device 102, the sub-device 102 may respond with an ACK by driving the sda_data 404 to a logic low.

Next at time T3, the main device 104 may transmit a register address indicating which of the registers at the sub-device 102 for writing. At time T4, the sub-device 102 may transmit an ACK to acknowledge the reception of the register address by driving the sda_data 404 to a logic low. Next at time T5, the main device 104 may transmit data for writing the register specified by the register address. At time T6, the sub-device 102 may transmitting an ACK to acknowledge the reception of the data by driving the sda_data 404 to a logic low.

At time T7, the main device 104 may end the communication 400 by transmitting a stop command (shown by STOP). As discussed above, the stop command or stop condition may be defined by a low-to-high transition on the SDA bus line 109 while the SCL line 107 is high.

Figure 5:
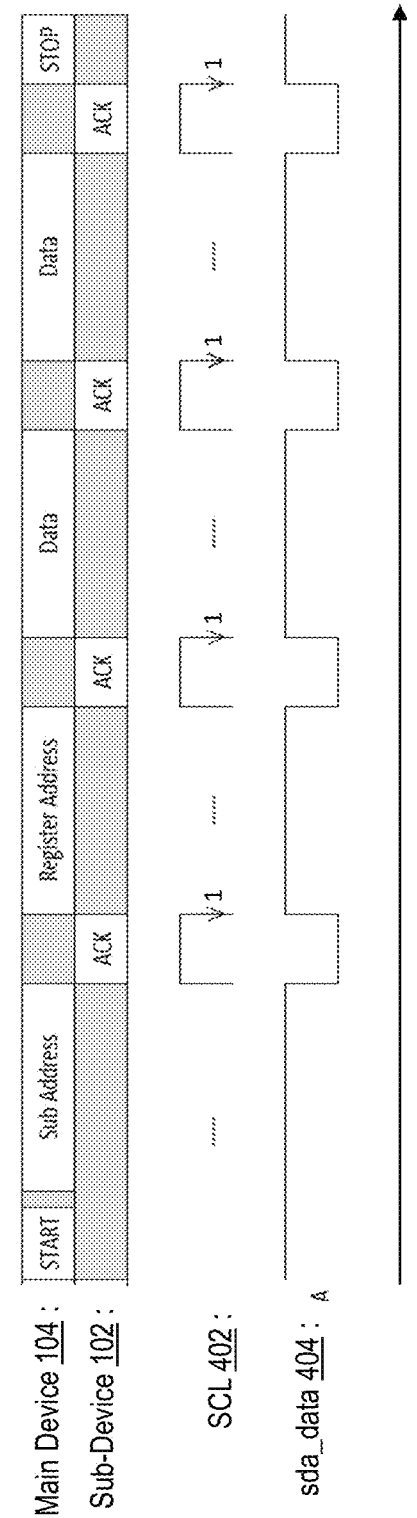
FIG. 5 is a timing diagram illustrating an exemplary data communication over an I2C bus for a burst write.

FIG. 5 is a timing diagram illustrating an exemplary data communication 500 over an I2C bus for a burst write. For instance, the main device 104 may write multiple bytes to the sub-device over the bus 108 as shown by the data communication 500. As shown in FIG. 5, the data communication 500 may be similar to the data communication 400 in many respects, but the main device 104 may transmit two data bytes to the sub-device instead of a single byte, and the sub-device 102 may respond to each data byte with an ACK.

FIG. 6 is a timing diagram illustrating an exemplary data communication 600 over an I2C bus for a data byte read operation. For instance, the main device 104 may read a single byte of data from the sub-device over the bus 108 as shown by the data communication 600.

As shown in FIG. 6, at time T0, the main device 104 may transmit a start command (shown by START), followed by an address of the sub-device 102 (shown by Sub Address) at time T1. At time T2, upon detecting the Sub Address corresponding to the sub-device 102, the sub-device 102 may respond with an ACK by driving the sda_data 404 to a logic low. Next at time T3, the main device 104 may transmit a register address indicating which of the registers at the sub-device for reading. At time T4, the sub-device 102 may transmit an ACK to acknowledge the reception of the register address by driving the sda_data 404 to a logic low.

Next at time T5, the main device 104 may transmit a start command again. followed by transmitting the sub-device 102's address and an indication of a read operation at time T6. At time T7, the sub-device 102 may respond with an ACK by driving the sda_data 404 to a logic low. Next at time T8, the sub-device 102 may transmit the data read from the register specified by the register address. At time T9, the main device 104 may transmit an NACK to indicate no additional data is to be transmitted. At time T10, the main device 104 may transmit a stop command to end the data communication 600.

FIG. 7 is a timing diagram illustrating an exemplary data communication 700 over an I2C bus for a burst read. For instance, the main device 104 may read multiple bytes from the sub-device over the bus 108 as shown by the data communication 700. As shown in FIG. 7, the data communication 700 may be similar to the data communication 600 in many respects, but the main device 104 may read two data bytes of data from the sub-device 102 instead of a single byte, and the main device 104 may respond to each data byte with an ACK if there is more data to be transmitted or an NACK if there is no additional data to be transmitted.

As can be seen from FIGS. 4-7, the sub-device 102 may release the sda_data 404 at the end of each transmitted ACK. As can be further seen from FIGS. 4-5, the sda_data 404 may at most be at a logic low for one clock cycle when an ACK is transmitted by the sub-device 102. As can be further seen from FIGS. 6-7, the sub-device 102 can at most transmits 9 consecutive bits of zeros, where a first bit may correspond to an ACK for a previous byte (e.g., the sub-device 102's address and the read operation indication) and the remaining 8 bits may correspond to a byte of data with all 0 bits (shown by 602 in FIGS. 6 and 702 in FIG. 7). Accordingly, an internal SDA bus fault condition at the sub-device can be detected based on a duration or a number of consecutive clock cycles that an internal SDA signal stays at a logic low.

Figure 8:
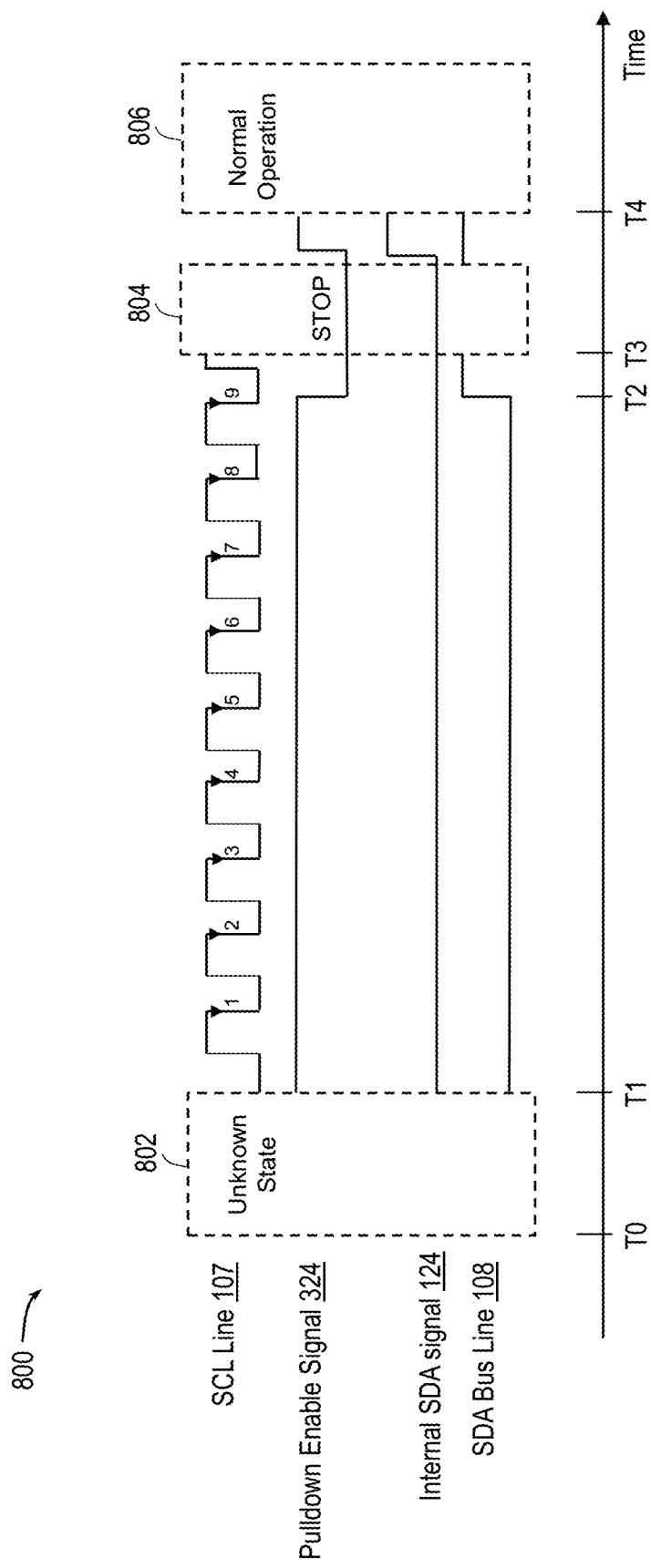
FIG. 8 is a timing diagram illustrating an exemplary I2C bus stuck recovery scheme, according to some embodiments of the present disclosure.

FIG. 8 is a timing diagram illustrating an exemplary I2C bus stuck recovery scheme 800, according to some embodiments of the present disclosure. The scheme 800 may be implemented by the main device 104 and the sub-device 102. The scheme 800 may use the same mechanism as discussed above with reference to FIGS. 1-7. In FIG. 8, the x-axis may represent time in some arbitrary units.

Prior to time T0, the sub-device 102 may communicate be in the middle of a communication (e.g., the communication 600 or 700) with the main device 104 over the bus 108. At time T0, there is an unknown state event 802 (faulty condition) at the sub-device 102.

At time T1, after the unknown state event 802, the internal SDA signal line 124 is struck at a logic low, which also drives the SDA bus line 109 to a logic low. The pulldown enable signal 324 may be at a logic high, allowing the internal SDA signal 124 to pulldown the SDA bus line 109 (e.g., when the internal SDA signal 124 is at a logic low). At time T2, when the internal SDA signal 124 stays at a logic low for 9 consecutive clock cycles based on the clock signal on the SCL line 107, the pulldown enable signal 324 may be de-asserted (to a logic low) to disable the internal SDA signal 124 from pulling or driving the SDA bus line 109 to a logic low. That is, the internal SDA signal 124 may return to a logic high, ready to listen on the SDA bus line 109 (e.g., returning to a receiving mode). The counting of the 9 clock cycles is based on the negative edges (high-to-low transitions indicated by the down-arrows) of the clock signal. In an example, the 9 clock cycles may be provided by the main device 104 during the state 204 discussed above with reference to FIG. 2.

At time T3, the main device 104 may transmit a stop command (shown by 804). The stop command may end the communication interrupted by the unknown state 802. At time T4, after the stop command, the main device 104 and the sub-device 102 may return to normal operations 806, where the main device 104 may again communicate with the sub-device 102 (e.g., as shown in FIGS. 4-7).

As can be seen from FIGS. 4-7, the internal I2C bus stuck recovery mechanisms for the sub-device 102 discussed herein may not impact normal I2C communications between the main device 104 and the sub-device 102.

Figure 9:
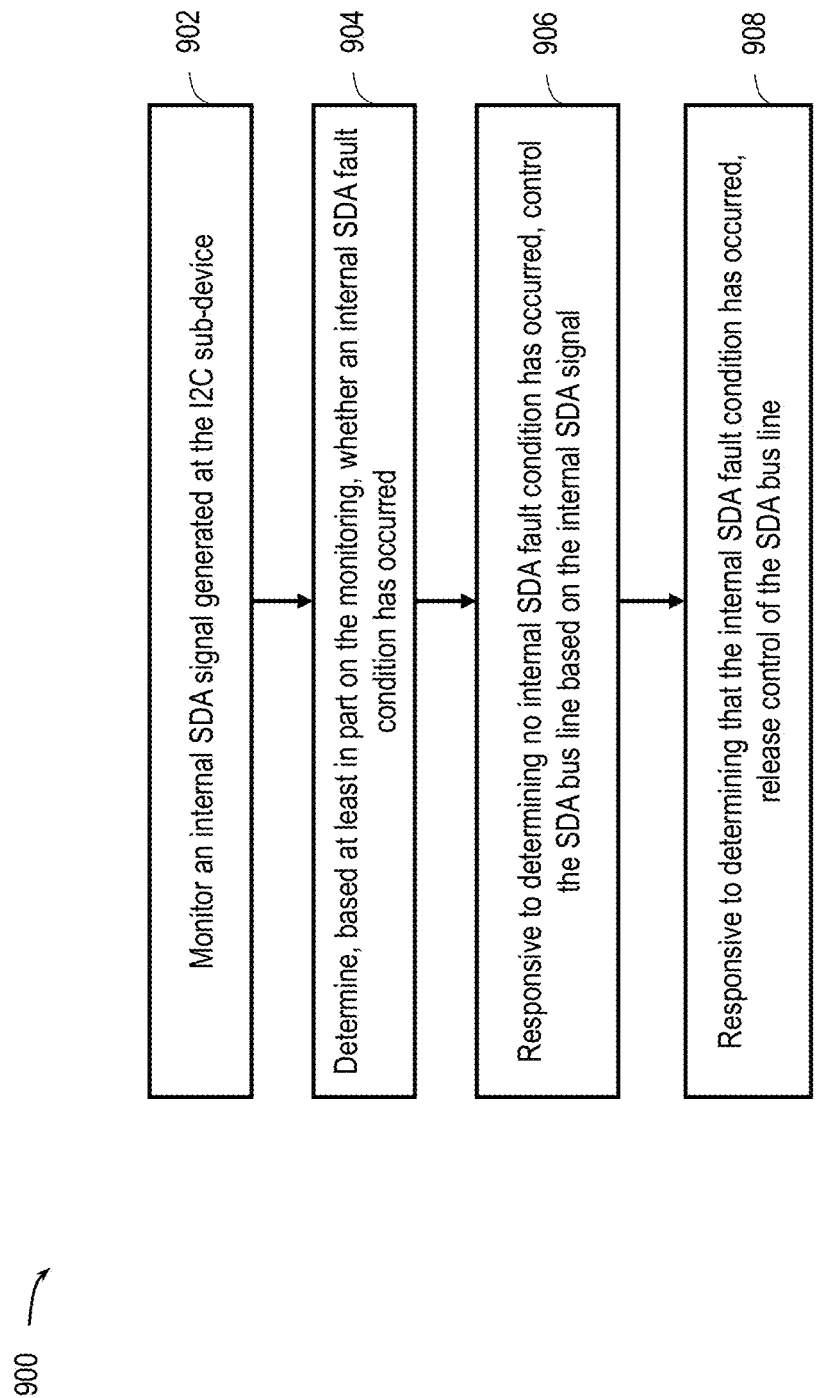
FIG. 9 is a flow diagram illustrating an exemplary method for communicating over an I2C bus with internal SDA bus stuck recovery, according to some embodiments of the present disclosure.

FIG. 9 is a flow diagram illustrating an exemplary method 900 for communicating over an I2C bus with bus stuck recovery mechanisms, according to some embodiments of the present disclosure. The method 900 can be implemented by a sub-device in an I2C communication system, where the sub-device may be coupled to a serial communication bus including an SCL line. In an aspect, the method 900 may be implemented by the sub-device 102 of FIG. 1, the serial communication bus may correspond to the bus 108, the SCL line may correspond to the SCL line 107, and the SDA bus line may correspond to the SDA bus line 109. In an aspect, the method 900 may be implemented by the device 2400 of FIG. 10. The method 900 may utilize similar mechanisms as discussed above with reference to FIGS. 1-8. Although the operations of the method 900 may be illustrated with reference to particular embodiments of the sub-device 102 disclosed herein, the method 900 may be performed using any suitable hardware components and/or software components. Operations are illustrated once each and in a particular order in FIG. 9, but the operations may be performed in parallel, reordered, and/or repeated as desired.

At 902, an internal SDA signal (e.g., the internal SDA signal 124) generated at the I2C sub-device may be monitored, for example, using the internal bus stuck recovery circuitry 120.

At 904, a determination may be made to determine whether an internal SDA fault condition has occurred at the I2C sub-device, for example, using the internal bus stuck recovery circuitry 120.

In some aspects, as part of determining whether the internal SDA fault condition has occurred, the I2C sub-device may count, using a counter (e.g., the counter circuitry 320 of FIG. 3), a number of clock cycles during which the internal SDA signal drives the SDA bus line to a voltage level (e.g., a logic low voltage level) indicative of the device operating in a non-receiving state (e.g., a transmitting mode) and compare the number of clock cycles to a threshold clock cycle count. The clock cycles may be based on a clock signal received on an SCL line (e.g., the SCL line 107). In some aspects, the counting the number of clock cycles during which the SDA signal drives the SDA bus line to the non-receiving state may be based on negative edges (high-to-low transitions) of the clock signal. In some aspects, the threshold clock cycle count (for determining whether the internal SDA fault condition has occurred) may be based on a number of clock cycles for communicating a single data byte and a corresponding acknowledgement on the SDA bus line. In some aspects, the threshold clock cycle count is at least 9.

In a further aspect, as part of determining whether the internal SDA fault condition has occurred, the I2C sub-device may determine that the internal SDA fault condition has occurred based on the number of clock cycles during which the internal SDA signal drives the SDA bus line to the voltage level (e.g., a logic low) indicative of the sub-device operating in the non-receiving state satisfying the threshold clock cycle count. Conversely, the I2C sub-device may determine no internal SDA fault condition has occurred based on the number of clock cycles during which the internal SDA signal drives the SDA bus line to the voltage level indicative of the sub-device operating in the non-receiving state is below the threshold clock cycle count.

At 906, responsive to determining no internal SDA fault condition has occurred, the SDA bus line may be controlled based on the internal SDA signal. In other words, when the internal SDA signal is at a logic high, the SDA bus line may be released (e.g., so that a pullup resistor may pull the SDA bus line to a power rail representing a logic high). Conversely, when the internal SDA is at a logic low, the internal SDA may be pulled to a logic low voltage level.

At 908, responsive to determining the internal SDA fault condition has occurred, control of the SDA bus line may be released. In other words, the internal SDA signal may be ignored or disregarded, and the SDA bus line may be released independent of the state (e.g., logic high or logic low) the internal SDA signal.

In some aspects, the voltage level of the SDA bus line indicative of the I2C sub-device operating in the non-receiving state may correspond to a logic low voltage level, and the releasing control of the SDA bus line at 908 may include switching off a driver (e.g., the transistor 116) that pulls the SDA bus line to the logic low voltage level.

In some aspects, after releasing control of the SDA bus line at 908, the I2C sub-device may further receive a start command from the SDA bus line and reset the counter (e.g., the counter circuitry 320) in response to the start command. In an example, after detecting the internal SDA fault condition has occurred at 904, the I2C sub-device may receive 9 clock pulses (e.g., provided by a respective main device in communication with the sub-device) and may release the SDA bus line as shown in FIG. 8. The I2C sub-device may receive the start command (e.g., from the main device) for a next (normal) communication cycle. The start command may operate as a release to the port reset.

In some aspects, after releasing control of the SDA bus line at 908, the I2C sub-device may receive a stop command from the SDA bus line. In some aspects, after releasing control of the SDA bus line at 908, the sub-device may receive a soft reset command from the SDA bus line.

Figure 10:
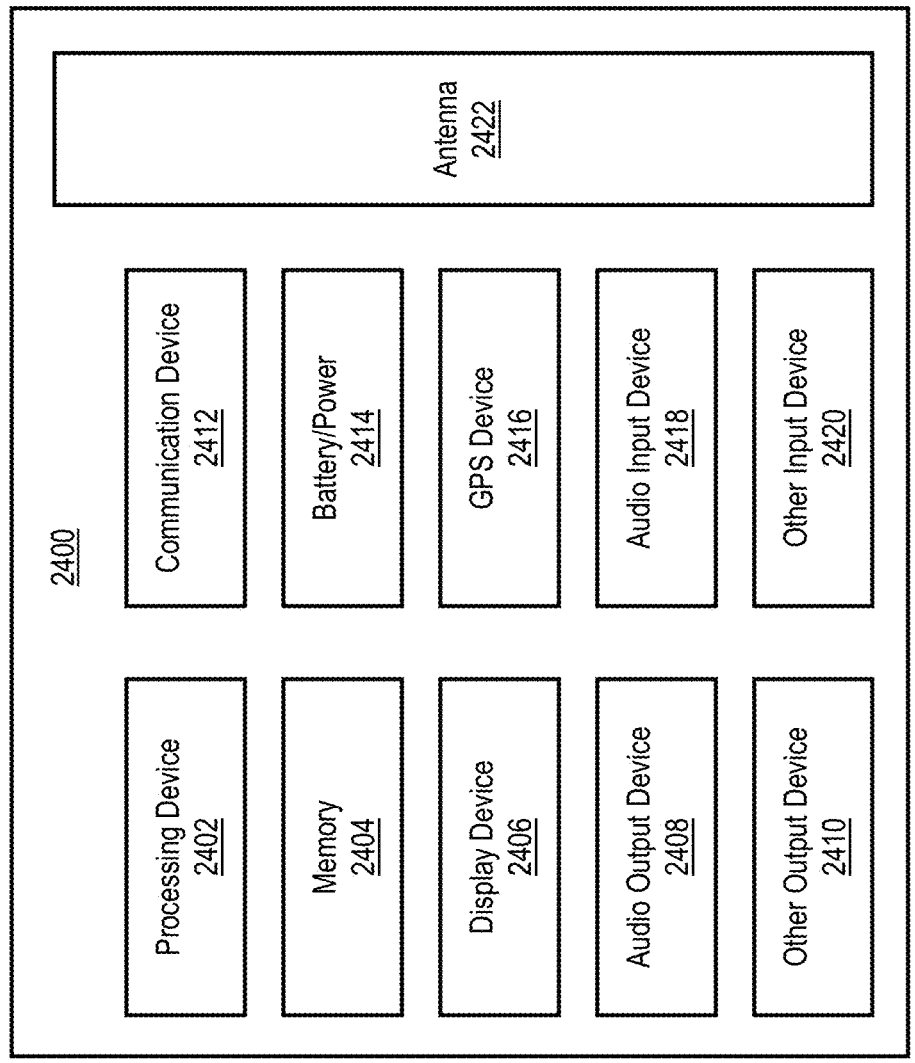
FIG. 10 is a block diagram of an exemplary electrical device that may implement at least some of internal SDA bus stuck recovery mechanisms discussed herein, according to some embodiments of the present disclosure.

FIG. 10 is a block diagram of an exemplary electrical device 2400 that may include any of the sub-device 102 with the internal bus stuck recovery circuitry 120 disclosed herein, or may include one or more components that perform any of the scheme 800 and/or the method 900 disclosed herein. For example, at least some of the device(s) or components of the device 2400 may include the internal bus stuck recovery circuitry 120 as discussed above with reference to FIGS. 1-9. A number of components are illustrated in FIG. 10 as included in the device 2400, but any one or more of these components may be omitted or duplicated, as suitable for the application. In some embodiments, some or all of the components included in the electrical device 2400 may be attached to one or more motherboards. In some embodiments, some or all of these components may be fabricated onto a single system-on-a-chip (SoC) die.

Additionally, in various embodiments, the device 2400 may not include one or more of the components illustrated in FIG. 10, but the device 2400 may include interface circuitry for coupling to the one or more components. For example, the device 2400 may not include a display device 2406, but may include display device interface circuitry (e.g., a connector and driver circuitry) to which a display device 2406 may be coupled. In another set of examples, the device 2400 may not include an audio input device 2418 or an audio output device 2408, but may include audio input or output device interface circuitry (e.g., connectors and supporting circuitry) to which an audio input device 2418 or audio output device 2408 may be coupled.

The device 2400 may include a processing device 2402 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 2402 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

In some embodiments, the electrical device 2400 may include a memory 2404, which may itself include one or more memory devices such as volatile memory (e.g., dynamic random access memory (DRAM)), nonvolatile memory (e.g., read-only memory (ROM)), flash memory, solid state memory, and/or a hard drive. In some embodiments, the memory 2404 may include memory that shares a die with the processing device 2402. This memory 2404 may be used as cache memory and may include embedded dynamic random access memory (eDRAM) or spin transfer torque magnetic random access memory (STT-MRAM).

In some embodiments, the electrical device 2400 may include a communication device 2412 (e.g., one or more communication devices). For example, the communication device 2412 may be configured for managing wireless communications for the transfer of data to and from the electrical device 2400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication device 2412 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 2412 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 2412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 2412 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication device 2412 may operate in accordance with other wireless protocols in other embodiments. The device 2400 may include an antenna 2422 to facilitate wireless communications and/or to receive other wireless communications (such as AM or FM radio transmissions).

In some embodiments, the communication device 2412 may manage wired communications using a protocol. Wired communications may include electrical, optical, or any other suitable communication protocols. Examples of wired communication protocols that may be enabled by the communication device 2412 include Ethernet, controller area network (CAN), I2C, media-oriented systems transport (MOST), or any other suitable wired communication protocol.

As noted above, the communication device 2412 may include multiple communication devices. For instance, a first communication device 2412 may be dedicated to shorter-range wireless communications such as Wi-Fi or Bluetooth, and a second communication device 2412 may be dedicated to longer-range wireless communications such as global positioning system (GPS), EDGE, GPRS, CDMA, WiMAX, LTE, EV-DO, or others. In some embodiments, a first communication device 2412 may be dedicated to wireless communications, and a second communication device 2412 may be dedicated to wired communications.

The device 2400 may include battery/power circuitry 2414. The battery/power circuitry 2414 may include one or more energy storage devices (e.g., batteries or capacitors) and/or circuitry for coupling components of the device 2400 to an energy source separate from the device 2400 (e.g., AC line power, voltage provided by a car battery, etc.).

The device 2400 may include a display device 2406 (or corresponding interface circuitry, for example, including the sub-controller 110 and the internal bus stuck recovery circuitry 120 discussed above). The display device 2406 may include any visual indicators, such as a heads-up display, a computer monitor, a projector, a touchscreen display, a liquid crystal display (LCD), a light-emitting diode display, or a flat panel display, for example.

The device 2400 may include an audio output device 2408. The audio output device 2408 may include any device that generates an audible indicator, such as speakers, headsets, or earbuds, for example.

The device 2400 may include an audio input device 2418 (or corresponding interface circuitry, for example, including the sub-controller 110 and the internal bus stuck recovery circuitry 120 discussed above). The audio input device 2418 may include any device that generates a signal representative of a sound, such as microphones, microphone arrays, or digital instruments (e.g., instruments having a musical instrument digital interface MIDI output).

The device 2400 may include a GPS device 2416 (or corresponding interface circuitry, for example, including the sub-controller 110 and the internal bus stuck recovery circuitry 120 discussed above). The GPS device 2416 may be in communication with a satellite-based system and may receive a location of the device 2400, as known in the art.

The device 2400 may include another output device 2410 (or corresponding interface circuitry, for example, including the sub-controller 110 and the internal bus stuck recovery circuitry 120 discussed above). Examples of the other output device 2410 may include an audio codec, a video codec, a printer, a wired or wireless transmitter for providing information to other devices, or an additional storage device. Additionally, an IC device 100 discussed herein may be included in the other output device 2410.

The device 2400 may include another input device 2420 (or corresponding interface circuitry, for example, including the sub-controller 110 and the internal bus stuck recovery circuitry 120 discussed above). Examples of the other input device 2420 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Any suitable ones of the display, input, output, communication, or memory devices described above with reference to the device 2400 may serve as the IC device 100 of FIG. 1. Alternatively or additionally, any suitable ones of the display, input, output, communication, or memory devices described above with reference to the device 2400 may be included in a controller or a node (e.g., a main device 104 or a sub-device 102).

The device 2400 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 2400 may be any other electronic device that processes data. While the device 2400 illustrates various components in which a communication interface may utilize a sub-device 102 as discussed herein, the IC sub-device 100 can be implemented by any suitable devices for serial communication.

The following paragraphs provide various examples of the embodiments disclosed herein.

Example 1 includes a method performed by an inter-integrated circuit (I2C) sub-device coupled to a serial communication bus including a serial clock (SCL) line and a serial data (SDA) bus line, the method including monitoring an internal SDA signal generated at the I2C device; determining, based at least in part on the monitoring, whether an internal SDA fault condition has occurred; responsive to determining no internal SDA fault condition has occurred, controlling the SDA bus line based on the internal SDA signal; and responsive to determining the internal SDA fault condition has occurred, releasing control of the SDA bus line.

Example 2 includes the method of example 1, where the determining whether the internal SDA fault condition has occurred includes counting, using a counter, a number of clock cycles during which the internal SDA signal drives the SDA bus line to a voltage level indicative of the device operating in a non-receiving state, the clock cycles based on a clock signal on the SCL line; and comparing the number of clock cycles to a threshold clock cycle count.

Example 3 includes the method of any one of examples 1-2, where the determining whether the internal SDA fault condition has occurred includes determining the internal SDA fault condition has occurred based on the number of clock cycles during which the internal SDA signal drives the SDA bus line to the voltage level indicative of the I2C device operating in the non-receiving state satisfying the threshold clock cycle count.

Example 4 includes the method of any one of examples 1-3, where the counting the number of clock cycles during which internal the SDA signal drives the SDA bus line to the non-receiving state is based on negative edges of the clock signal.

Example 5 includes the method of any one of examples 1-4, where the threshold clock cycle count for determining whether the internal SDA fault condition has occurred is based on a number of clock cycles for communicating a single data byte and a corresponding acknowledgement on the SDA bus line.

Example 6 includes the method of any one of examples 1-5, where the threshold clock cycle count for determining whether the internal SDA fault condition has occurred is at least 9.

Example 7 includes the method of any one of examples 1-5, where the voltage level of the SDA bus line indicative of the I2C device operating in the non-receiving state corresponds to a logic low voltage level; and the releasing control of the SDA bus line includes switching off a driver that pulls the SDA bus line to the logic low voltage level.

Example 8 includes the method of any one of examples 1-7, further including receiving a start command from the SDA bus line after releasing control of the SDA bus line; and resetting the counter responsive to the start command.

Example 9 includes the method of example 1, further including receiving a stop command from the SDA bus line after releasing control of the SDA bus line.

Example 10 includes the method of example 1, further including receiving a soft reset command from the SDA bus line after releasing control of the SDA bus line.

Example 11 includes an integrated circuit (IC) device including interface circuitry coupled to a two-wire serial communication bus having a serial clock (SCL) line and a serial data (SDA) bus line; and bus stuck recovery circuitry to monitor for a local SDA fault condition at the IC device based on a number of clock cycles during which an internal SDA signal drives the SDA bus line to a first signal state, the clock cycles based on a clock signal received from the SCL line; and responsive to the local SDA fault condition, release the SDA bus line independent of the internal SDA signal, where the SDA bus line is in a second signal state different from the first signal state based on the release.

Example 12 includes the IC device of example 11, where the local SDA fault condition is triggered based on the number of clock cycles during which the internal SDA signal drives the SDA bus line to the first signal state satisfying a threshold clock cycle count.

Example 13 includes the IC device of any one of examples 11-12, where the threshold clock cycle count that triggers the local SDA fault condition is at least 9.

Example 14 includes the IC device of any one of examples 11-13, where the bus stuck recovery circuitry includes counter circuitry to count the number of clock cycles during which the internal SDA signal drives the SDA bus line to the first signal state.

Example 15 includes the IC device of any one of examples 11-14, where the counter circuitry is triggered by negative edges of the clock signal.

Example 16 includes the IC device of any one of examples 11-15, where the counter circuitry is activated when the internal SDA signal is at the first signal state and inactivated when the internal SDA signal is at the second signal state.

Example 17 includes the IC device of any one of examples 11-16, where the counter circuitry includes a plurality of cascaded flip-flops.

Example 18 includes the IC device of any one of examples 11-17, where the first signal state corresponds to a logic low voltage level and the second signal state corresponds to a logic high voltage level.

Example 19 includes the IC device of any one of examples 11-18, where the IC device is an I2C sub-device.

Example 20 includes an integrated circuit (IC) device including interface circuitry for connection to an inter-integrated circuit (I2C) bus having a serial clock (SCL) line and a serial data (SDA) bus line; and I2C bus stuck recovery circuitry including a first port to receive an internal SDA signal generated at the IC device; a second port coupled to the interface circuitry to receive a clock signal from the SCL line; a third port to output a driver control signal to the interface circuitry for driving the SDA bus line; first logic circuitry to generate a pulldown-enable signal to selectively enable or disable pulling the SDA bus line to a logic low voltage level, the generating based on a number of consecutive clock cycles of the clock signal during which the internal SDA signal has a logic low; and second logic circuitry to generate the driver control signal based at least in part on the pulldown-enable signal.

Example 21 includes the IC device of example 20, where the first logic circuitry generates the pulldown-enable signal to disable pulling the SDA bus line to the logic low voltage level based on the number of consecutive clock cycles during which the internal SDA signal has the logic low satisfies (e.g., equals to or greater than) a threshold clock cycle count.

Example 22 includes the IC device of any one of examples 20-21, where the first logic circuitry generates the pulldown-enable signal to enable pulling the SDA bus line to the logic low voltage level based on the number of consecutive clock cycles during which the internal SDA signal has the logic low is less than a threshold clock cycle count.

Example 23 includes the IC device of any one of examples 20-22, where the threshold clock cycle count is at least 9.

Example 24 includes the IC device any one of examples 20-23, where the first logic circuitry includes a plurality of cascaded flip-flops clocked by negative edges of the clock signal.

Example 25 includes the IC device of any one of examples 20-24, where the cascaded flip-flops are reset based on the internal SDA signal at the IC device having a logic high.

Example 26 includes the IC device of any one of examples 20-25, where the interface circuitry includes a transistor having a drain terminal coupled to the SDA bus line, a gate terminal coupled to the third port of the I2C bus stuck recovery circuitry, and a source terminal coupled to a voltage rail having a voltage corresponding to the logic low voltage level.

Example 27 includes an apparatus including means for performing the method of any one of examples 1-10.

VARIATIONS AND IMPLEMENTATIONS

While embodiments of the present disclosure were described above with references to exemplary implementations as shown in FIGS. 1-9, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

In the discussions of the embodiments above, components of a system, such flip-flops, NAND gates, NOT gates, buffers, transistors, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to internal SDA bus fault recovery at a sub-device, in various communication systems.

Parts of various systems for internal SDA bus fault recovery at a sub-device as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components of the apparatuses and/or sub-device 102 of FIG. 1, the internal bus stuck recovery circuitry 120 of FIG. 3) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Also, as used herein, the terms "substantially," "approximately," "about," etc., may be used to generally refer to being within +/−20% of a target value, e.g., within +/−10% of a target value, based on the context of a particular value as described herein or as known in the art.

Numerous other changes, substitutions, variations, alterations, and modifications may be ascertained to one skilled in the art and it is intended that the present disclosure encompass all such changes, substitutions, variations, alterations, and modifications as falling within the scope of the examples and appended claims. Note that all optional features of the apparatus described above may also be implemented with respect to the method or process described herein and specifics in the examples may be used anywhere in one or more embodiments.

The invention claimed is:

1. A method performed by an inter-integrated circuit (I2C) sub-device coupled to a two-wire serial communication bus including a serial data (SDA) bus line, the method comprising:
monitoring an internal SDA signal generated at the I2C sub-device;
determining, based at least in part on the monitoring and using a clock signal on a serial clock (SCL) line present in the two-wire serial communication bus, whether an internal SDA fault condition has occurred during which an internal SDA signal in a first signal state drives the SDA bus line to the first signal state, the internal SDA fault condition causing the I2C sub-device to be unable to communicate with a device coupled to the I2C sub-device via the two-wire serial communication bus;
responsive to determining that no internal SDA fault condition has occurred, controlling the SDA bus line based on the internal SDA signal; and
responsive to determining that the internal SDA fault condition has occurred, releasing control of the SDA bus line independent of the internal SDA signal in the first signal state, wherein the SDA bus line is in a second signal state different from the first signal state based on the release.

2. The method of claim 1, wherein the determining whether the internal SDA fault condition has occurred comprises:
counting, using a counter, a number of clock cycles during which the internal SDA signal in the first signal state drives the SDA bus line to the first signal state, with the first signal state corresponding to a voltage level indicative of the I2C sub-device operating in a non-receiving state, the clock cycles based on the clock signal on the SCL line; and
comparing the number of clock cycles to a threshold clock cycle count.

3. The method of claim 2, wherein the determining whether the internal SDA fault condition has occurred further comprises:
determining the internal SDA fault condition has occurred based on the number of clock cycles during which the internal SDA signal drives the SDA bus line to the voltage level indicative of the I2C sub-device operating in the non-receiving state satisfying the threshold clock cycle count.

4. The method of claim 2, wherein the counting the number of clock cycles during which internal the SDA signal drives the SDA bus line to the non-receiving state is based on negative edges of the clock signal on the SCL line.

5. The method of claim 2, wherein the threshold clock cycle count for determining whether the internal SDA fault condition has occurred is based on a number of clock cycles for communicating a single data byte and a corresponding acknowledgement on the SDA bus line.

6. The method of claim 2, wherein the threshold clock cycle count for determining whether the internal SDA fault condition has occurred is equal to at least 9.

7. The method of claim 2, wherein:
the voltage level of the SDA bus line indicative of the I2C sub-device operating in the non-receiving state corresponds to a logic low voltage level; and
the releasing control of the SDA bus line comprises:
switching off a driver that pulls the SDA bus line to the logic low voltage level.

8. The method of claim 2, further comprising:
receiving a start command from the SDA bus line after releasing control of the SDA bus line; and
resetting the counter responsive to the start command.

9. An integrated circuit (IC) device comprising:
interface circuitry coupled to a two-wire serial communication bus having a serial clock (SCL) line and a serial data (SDA) bus line; and
bus stuck recovery circuitry to:
monitor for a local SDA fault condition at the IC device based on a number of clock cycles during which an internal SDA signal in a first signal state drives the SDA bus line to the first signal state, the local SDA fault condition causing the IC device to be unable to communicate with a device coupled to the IC device via the two-wire serial communication bus, with the clock cycles based on a clock signal received from the SCL line; and
responsive to occurrence of the local SDA fault condition, release the SDA bus line independent of the internal SDA signal in the first signal state, wherein the SDA bus line is in a second signal state different from the first signal state based on the release.

10. The IC device of claim 9, wherein the local SDA fault condition is triggered based on the number of clock cycles during which the internal SDA signal drives the SDA bus line to the first signal state satisfying a threshold clock cycle count.

11. The IC device of claim 10, wherein the threshold clock cycle count that triggers the local SDA fault condition is equal to at least 9.

12. The IC device of claim 9, wherein the bus stuck recovery circuitry comprises counter circuitry to count the number of clock cycles during which the internal SDA signal drives the SDA bus line to the first signal state.

13. The IC device of claim 12, wherein the counter circuitry is triggered by negative edges of the clock signal.

14. The IC device of claim 12, wherein the counter circuitry is activated when the internal SDA signal is at the first signal state and inactivated when the internal SDA signal is at the second signal state.

15. The IC device of claim 9, wherein the first signal state corresponds to a logic low voltage level and the second signal state corresponds to a logic high voltage level.

* * * * *